CIRCULAR KNITTING MACHINE

Original Filed March 31, 1948 10 Sheets-Sheet 1

INVENTOR.
Paul L. Thurston
By
Robert E. Burns
ATTORNEY

April 12, 1955 P. L. THURSTON 2,705,878

CIRCULAR KNITTING MACHINE

Original Filed March 31, 1948 10 Sheets-Sheet 2

INVENTOR.
Paul L. Thurston

BY Robert E. Burns
ATTORNEY

April 12, 1955 P. L. THURSTON 2,705,878

CIRCULAR KNITTING MACHINE

Original Filed March 31, 1948 10 Sheets-Sheet 3

INVENTOR.

Paul L. Thurston

BY Robert E. Burns

ATTORNEY

April 12, 1955 P. L. THURSTON 2,705,878

CIRCULAR KNITTING MACHINE

Original Filed March 31, 1948 10 Sheets-Sheet 4

INVENTOR.

Paul L. Thurston

BY

Robert E. Burns

ATTORNEY

CIRCULAR KNITTING MACHINE

INVENTOR.
Paul L. Thurston
BY
Robert E. Burns
ATTORNEY

CIRCULAR KNITTING MACHINE

Original Filed March 31, 1948 10 Sheets-Sheet 6

INVENTOR.
Paul L. Thurston
BY
Robert E. Burns
ATTORNEY

April 12, 1955 P. L. THURSTON 2,705,878

CIRCULAR KNITTING MACHINE

Original Filed March 31, 1948 10 Sheets-Sheet 7

INVENTOR.
Paul L. Thurston
BY
Robert E. Burns
ATTORNEY

INVENTOR.
BY Paul L. Thurston
Robert E. Burns
ATTORNEY

INVENTOR.
Paul L. Thurston
BY
Robert E. Burns
ATTORNEY

April 12, 1955 P. L. THURSTON 2,705,878

CIRCULAR KNITTING MACHINE

Original Filed March 31, 1948 10 Sheets-Sheet 10

INVENTOR.

Paul L. Thurston

BY

Robert E. Burns

ATTORNEY 2,705,878
Patented Apr. 12, 1955

1

2,705,878

CIRCULAR KNITTING MACHINE

Paul L. Thurston, Martinsburg, W. Va., assignor to Interwoven Stocking Company, New Brunswick, N. J., a corporation of New Jersey Original application March 31, 1948, Serial No. 18,223. Divided and this application January 14, 1949, Serial No. 70,818

11 Claims. (Cl. 66—14)

The present invention relates to the production of multi-color patterned fabric on circular knitting machines having coaxial superposed needle cylinders with needles operable in either cylinder and transferable from one cylinder to the other.

In producing design fabrics on an opposed cylinder machine in accordance with the prior art various difficulties and objections were encountered. Various methods of obtaining designs in knitted fabrics are reverse plating, embroidery wrap and multiple feed. The designs obtainable by using a multiple feed are rather limited as the use of different colored threads at the respective feeds produces only single course horizontal stripes, which, at a short distance from the fabric, blend together to give the appearance of a mixed color. Embroidery wrap is extremely difficult with a two cylinder machine owing to the position of one cylinder above the other with only a narrow space between the upper and lower cylinder needles. Reverse plating has been used to considerable extent, but is not entirely satisfactory as there are too many seconds owing to the failure of the yarns to reverse properly. Moreover, reverse plating will not produce sharply contrasting solid color patterns, owing to the fact that the suppressed yarn shows through the face yarn.

The difficulties of producing multi-color designs are still greater in an opposed cylinder machine of the type having mechanism for transferring needles back and forth from one cylinder to the other to produce what is known as Links-Links fabric. Such fabric is characterized by the fact that selected wales instead of being formed throughout of the same kind of stitches are formed partly of outwardly facing or plain stitches, which are knit when needles are in the lower cylinder, and inwardly facing or rib stitches, which are knit when the needles are in the upper cylinder. The inwardly facing stitches and outwardly facing stitches are arranged in predetermined sequence to provide the desired pattern. A machine for producing Links-Links fabric is at best so complicated that the addition of any further attachments to the machine presents a formidable problem. This is particularly true of Links-Links machines for knitting hosiery. The small diameter of hosiery machines imposes serious space limitations. The requirements of producing a top portion of rib fabric different from that of the leg, an anti-ravel edge at the top of the sock, a plain knit sole portion and reciprocally knit heel and toe portions with narrowing and widening further increase the difficulty of adding any further patterning attachments to the machine. Reciprocatory knitting is a particular source of difficulty since the needles travel alternately in opposite directions relative to the actuating cams and must be capable of knitting in both directions.

In spite of these difficulties and obstacles, the present invention succeeds in producing attractive and widely varied color designs in fabric produced on coaxial knitting machines particularly Links-Links fabric. Using, for example, two thread feeds and two colors of yarn, it is possible, in accordance with the invention, to produce solid color areas of one color, other solid color areas of the other color and mixed color areas in which the two colors alternate in successive courses. As the colors in the mixed color areas tend to blend together to produce the visual effect of a component color, the fabric has the appearance of a three color fabric. Moreover, the mixed color areas may be formed of either inwardly facing stitches or outwardly facing stitches or both, thereby producing still further variety in appearance of the different areas of the fabric.

2

An infinite variety of color patterns is made possible in accordance with the present invention. For example, solid color areas of one color may be provided beside solid color areas of another color. Solid colored areas of different colors may also be provided one above the other in a walewise direction or one inside the other. The size and shape of the solid color areas may be varied as desired. A further feature of the invention is that the solid color areas are caused to stand out in relief to provide an embossed effect even when the fabric is stretched.

The mechanism required for producing the wide variety of color patterns in accordance with the present invention is relatively simple and is readily applicable to hosiery machines without interfering with their other functions. For example, a hosiery machine for carrying out the present invention will produce an article of hosiery having a welt or selvage, an expansible top portion, leg and instep portions embodying any of a wide variety of color patterns, a sole portion and reciprocatorily knit heel and toe portions.

The invention thus provides a new method of knitting, new apparatus for carrying out the method and knitted articles, in particular articles of hosiery, of new and improved construction produced by the said method. Further objects, characteristics and advantages of the invention will appear from the following description and accompanying drawings, which illustrate, by way of example, knitted articles embodying my invention and apparatus for producing such articles.

Figures 1, 2:
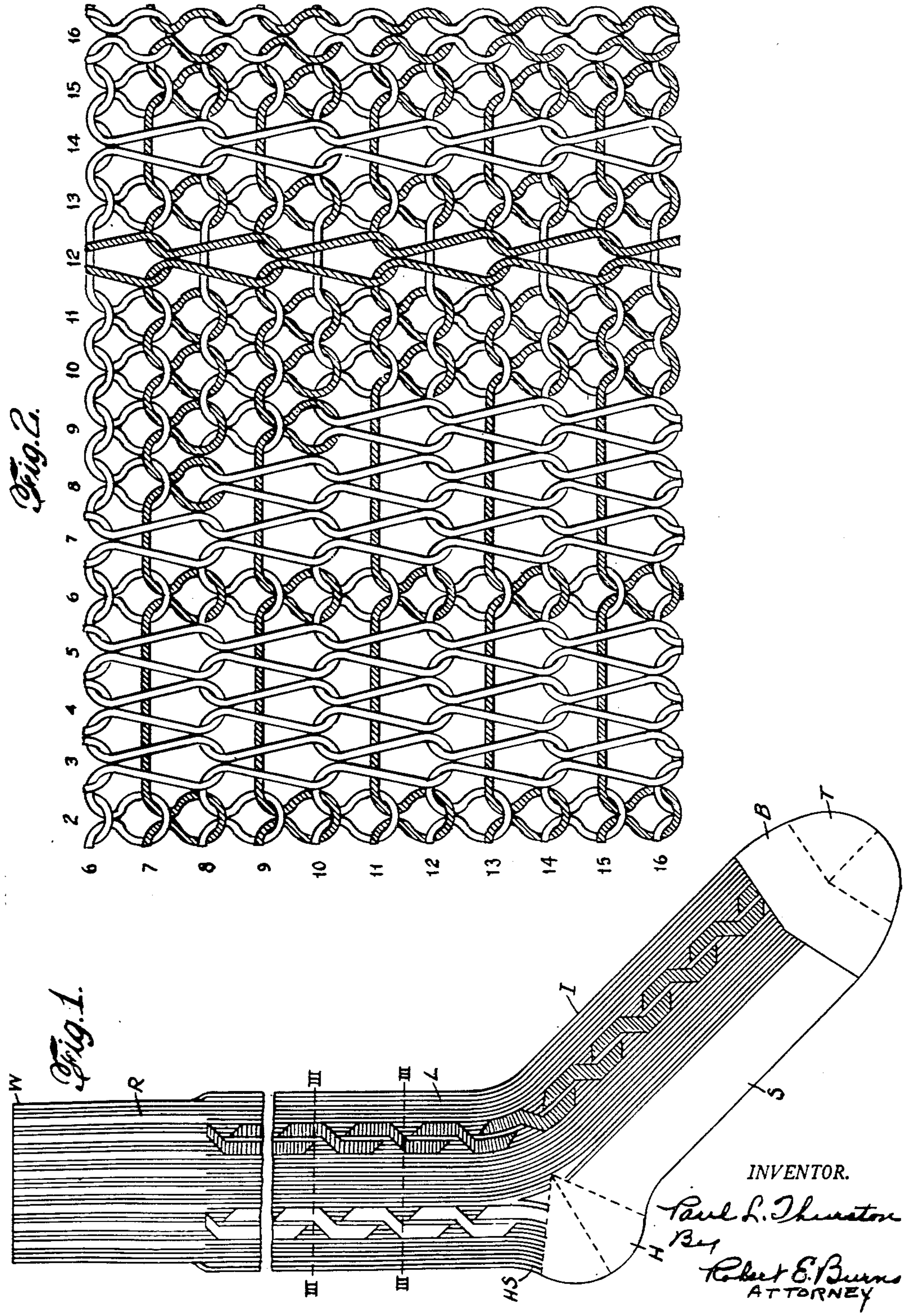
Fig. 1 is a side elevation of an article of hosiery embodying my invention.
Fig. 2 is a magnified schematic representation of the stitch structure of a small portion of the fabric of the leg portion of the article shown in Fig. 1 as viewed from the outside of the fabric, the numbering of the wales and courses being the same as in Fig. 3.
Figure 3:
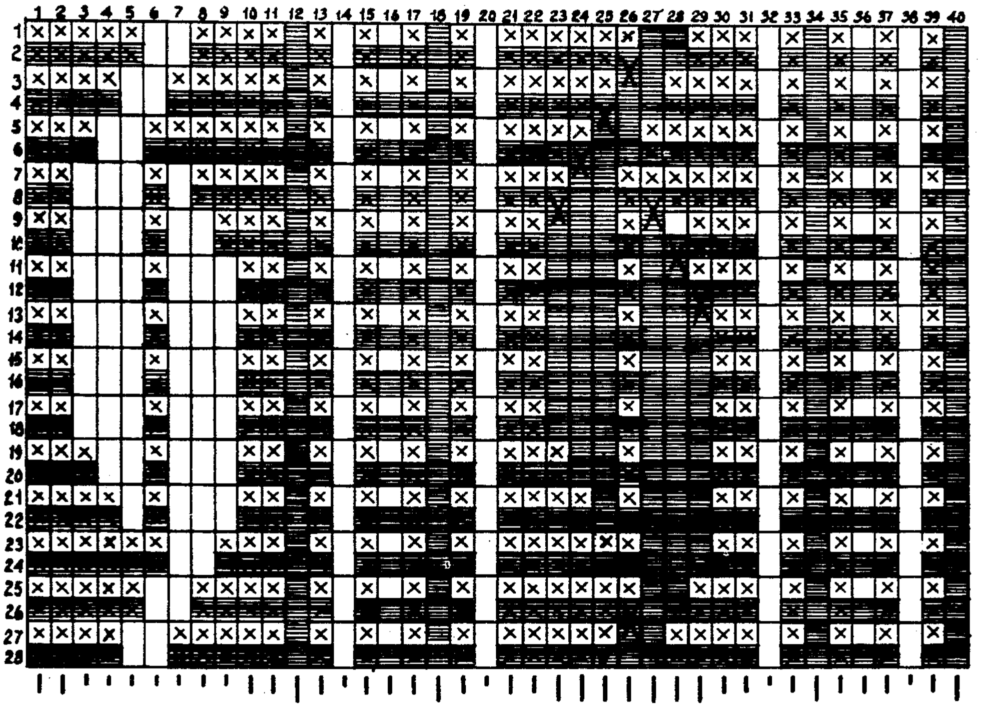

Fig. 3 is a stitch diagram of a representative portion of fabric of the leg portion of the article shown in Fig. 1 being an area indicated approximately by the broken lines, III in Fig. 1. In Fig. 3, each single stitch is represented by a small square. Stitches of double length are shown as rectangles comprising two squares. Wales and courses are numbered consecutively for convenience of reference. Stitches of one thread are indicated by horizontal shading; stitches of a second thread are unshaded. Inwardly facing stitches are indicated by an "x"; outwardly facing stitches are without an "x." The structure of representative stitches may be readily seen by reference to Fig. 2.

Figs. 4 to 7 are similar switch diagrams illustrating other embodiments of the invention.

Figure 8:
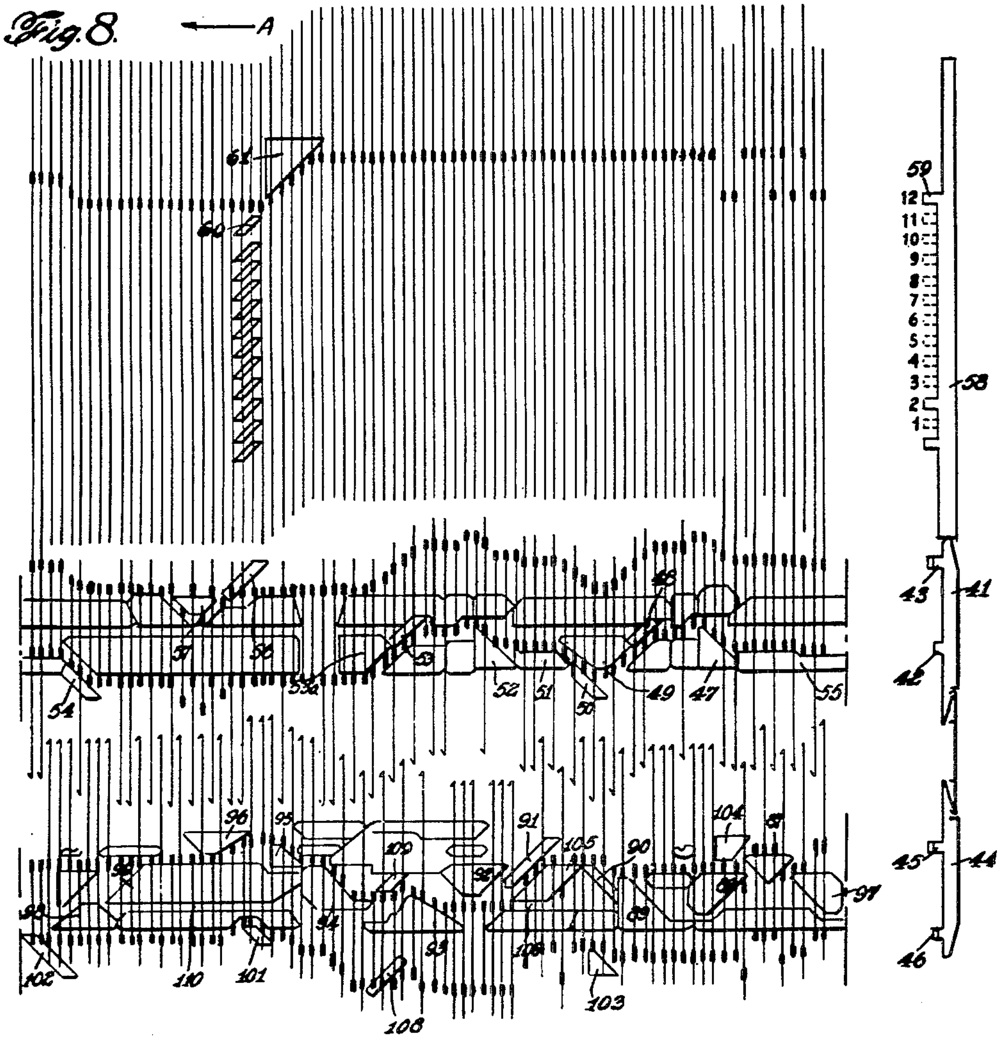

Fig. 8 is a schematic inside developed view of the upper and lower cam blocks of a coaxial type circular knitting machine for carrying out my invention, with needles, slider and selectors indicated schematically and with a representative needle, sliders and selector shown in side elevation at the right hand side of the figure.

Figure 9:
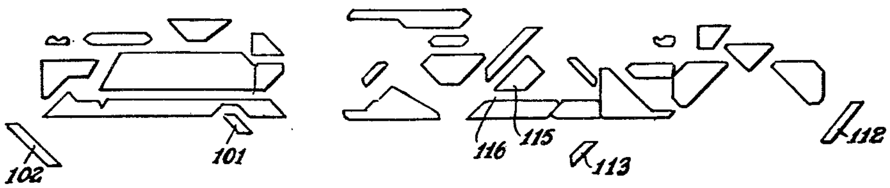

Fig. 9 is a similar view of a modified form of the lower cam block.

Figure 10:
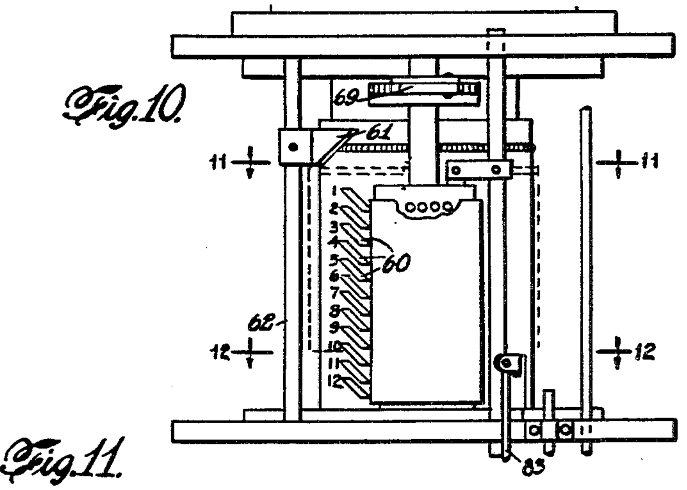

Fig. 10 is a front elevation of the upper portion of a coaxial cylinder knitting machine for carrying out the present invention showing Links-Links mechanism for transferring needles from one cylinder to the other.

Figures 11, 13:
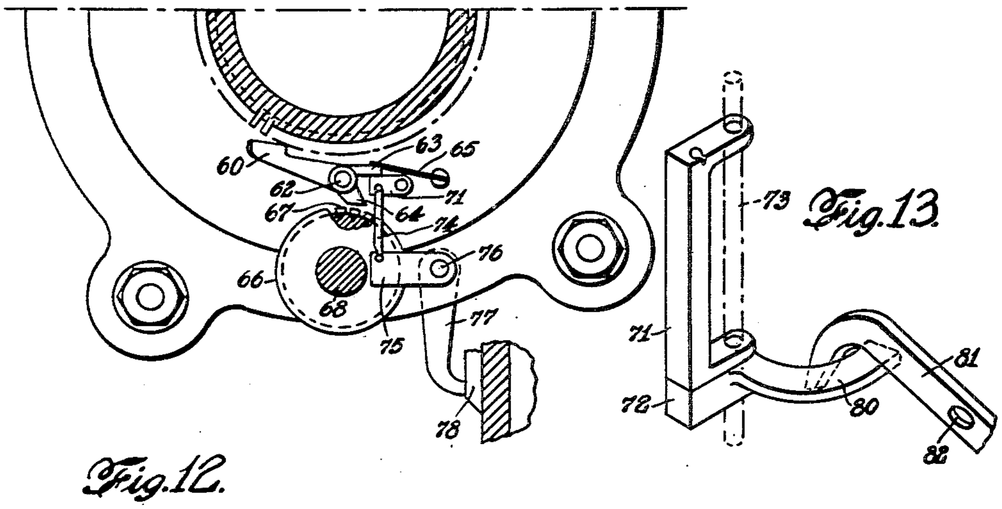
Figure 12:
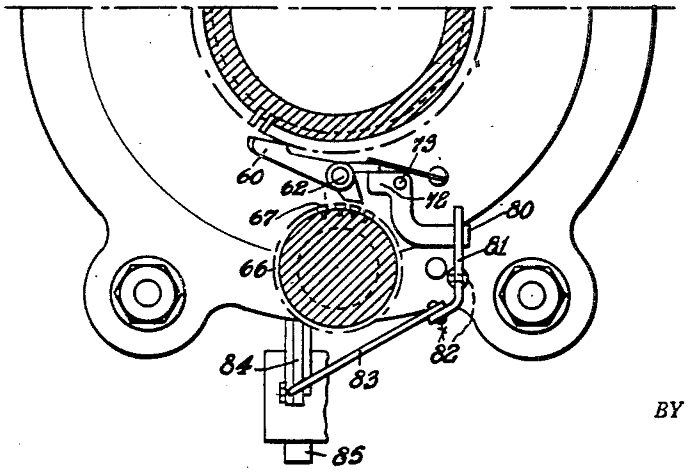

Figs. 11 and 12 are horizontal sectional views taken respectively on the line 11—11 and 12—12 of Fig. 10.

Fig. 13 is a perspective view of a portion of the mechanism shown in Figs. 11 and 12.

Figures 14, 15:
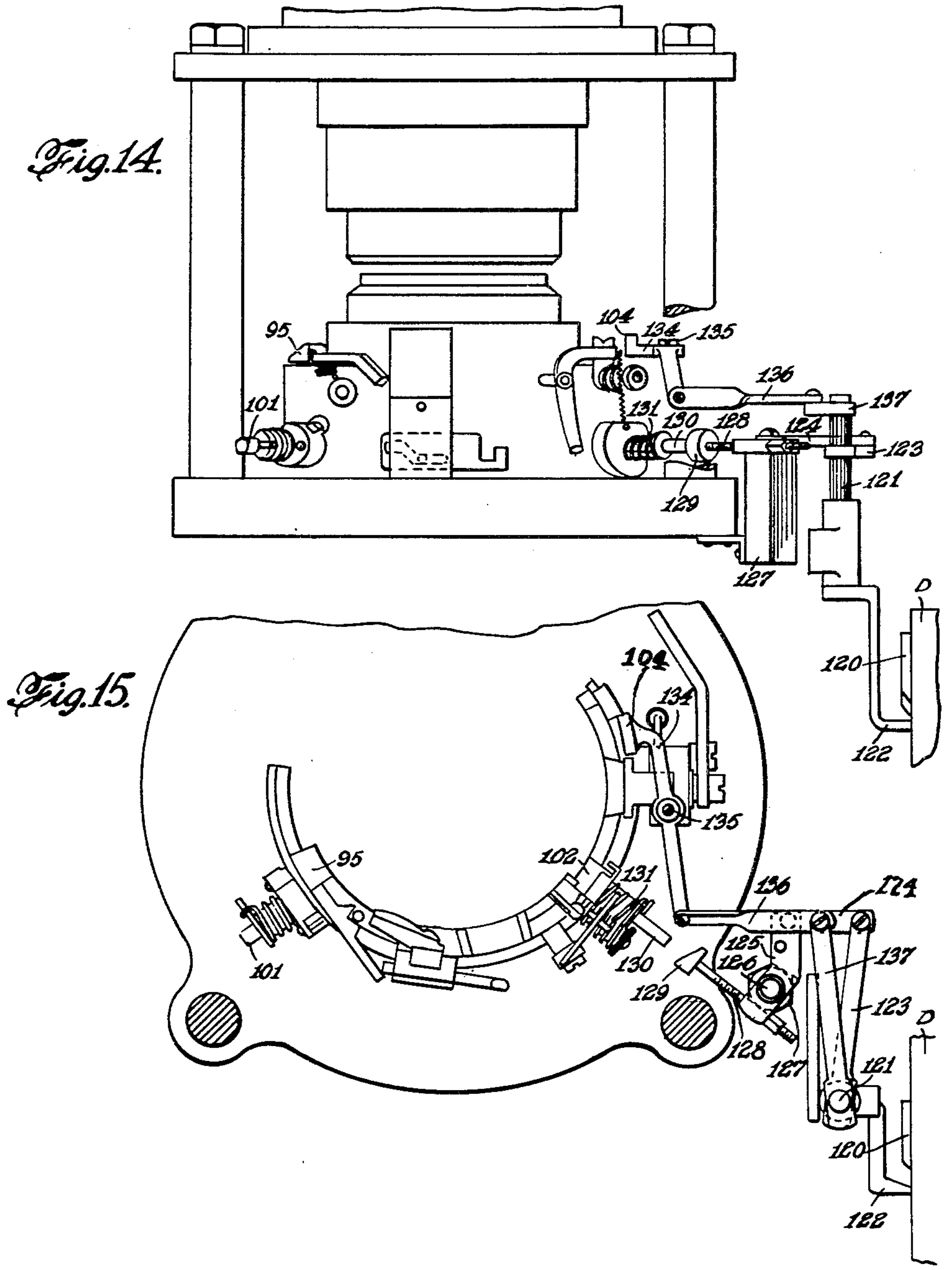

Fig. 14 is a side elevation of the central portion of a knitting machine illustrating mechanism for operating certain of the cams shown in Fig. 8.

Fig. 15 is a horizontal section taken approximately on the line 15—15 of Fig. 14.

Figure 16:
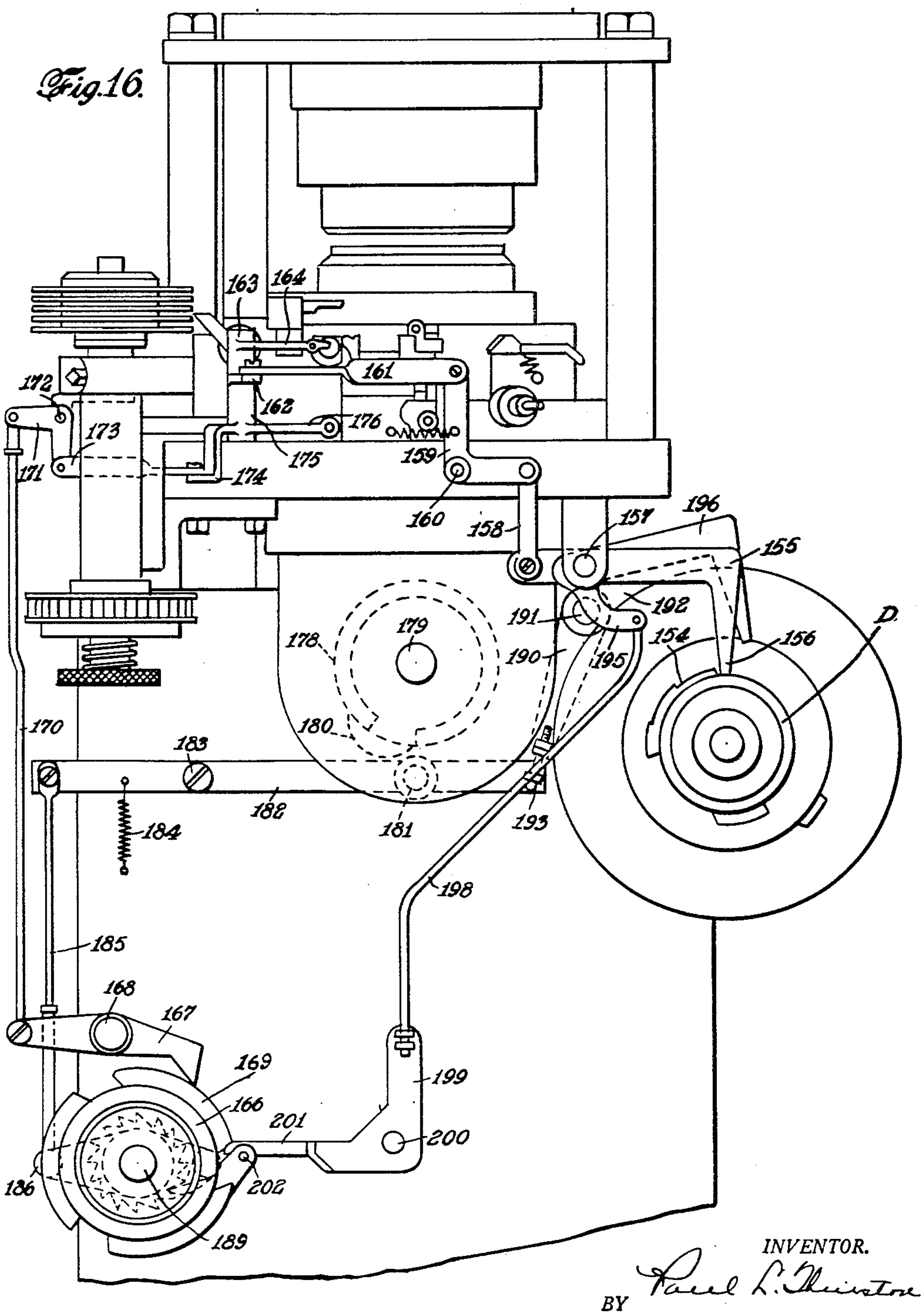

Fig. 16 is a side elevation illustrating mechanism for operating other cams shown in Figs. 8 and 9.

Figure 17:
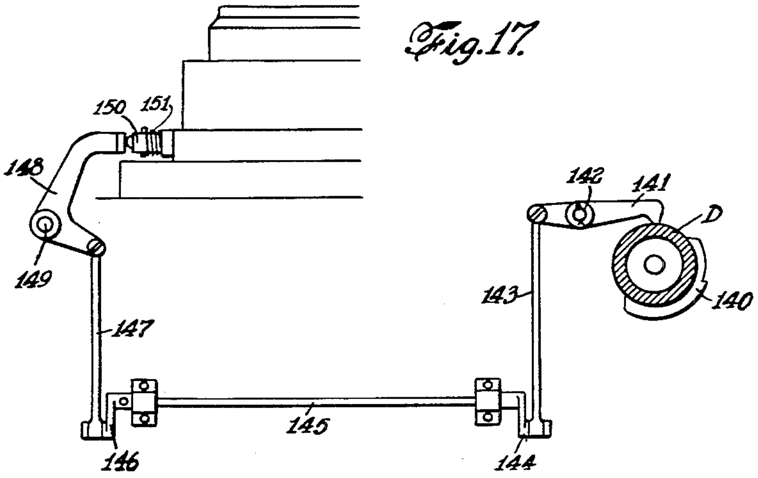

Fig. 17 is a schematic elevational view showing mechanism for operating a selecting cam in the lower cylinder cam block.

Figure 18:
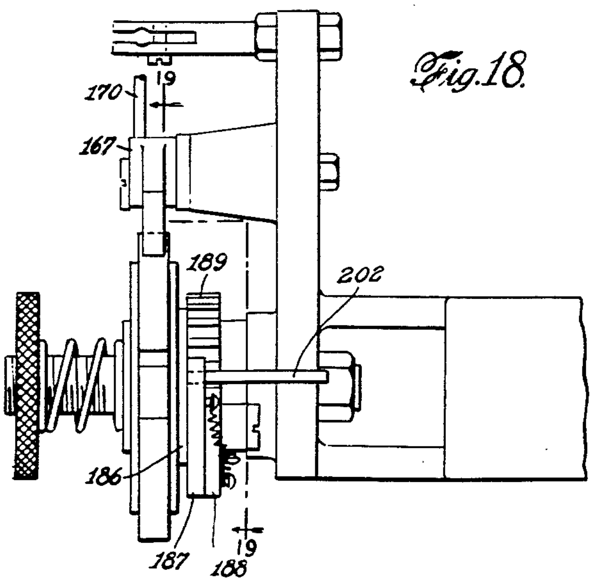

Fig. 18 is an enlarged elevation of auxiliary patterning mechanism shown in Fig. 16 as viewed from the right hand side of Fig. 16.

Figure 19:
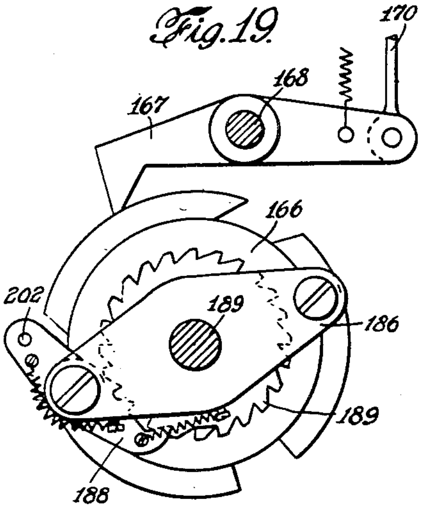

Fig. 19 is a cross section taken approximately on the line 19—19 of Fig. 18.

Figure 20:
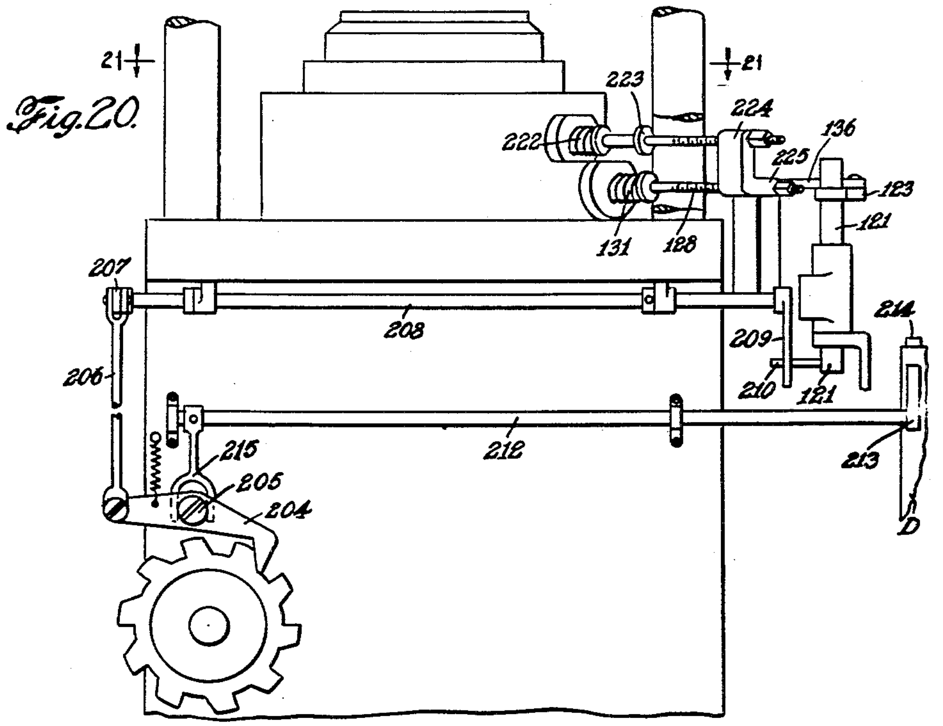

Fig. 20 is a side elevation showing another form of auxiliary patterning mechanism used to control selecting cams in advance of the first feeding station of the machine.

Figure 21:
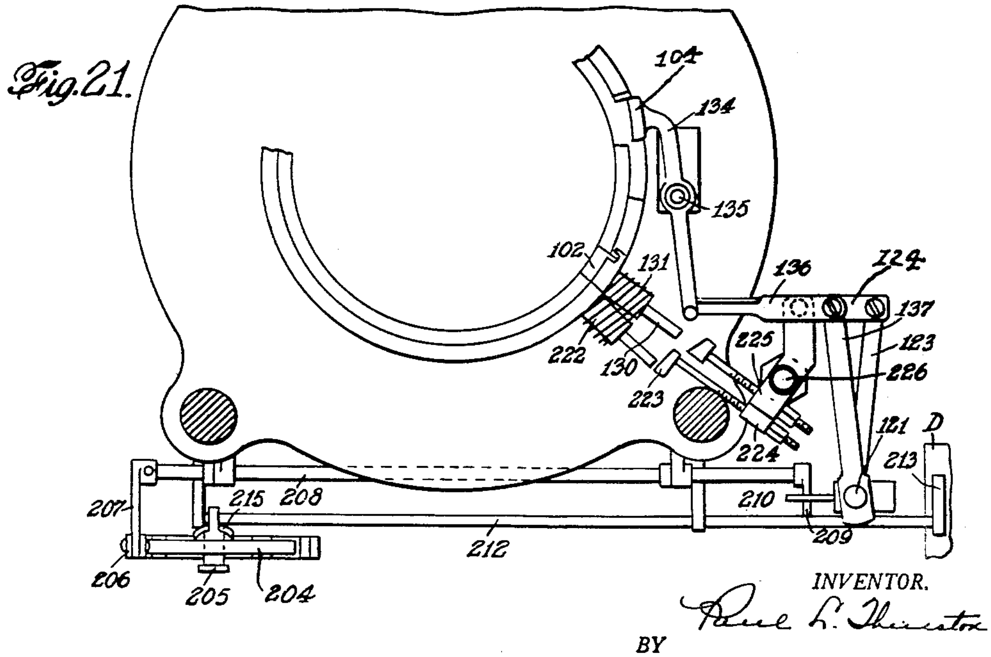

Fig. 21 is a horizontal section taken approximately on the line 21—21 of Fig. 20.

In Fig. 1 there is shown an article of hosiery produced in accordance with the present invention and comprising a rib top portion R having a selvage or welt W, a leg portion L, a heel portion H, a high splice portion HS above the heel, and instep portion I, a sole portion S, a toe band portion B, and a toe T.

The top R is formed of fabric capable of sufficient expansion and contraction to pass over the heel of the wearer without difficulty and yet grip the leg snugly when in place. In its contracted condition, the top is preferably narrower than the leg. For example, the top may be formed of rib knit fabric being preferably 2 x 2 rib as shown. Elastic thread may be incorporated in the top to give it additional stretch and recoverability and to make the sock self-supporting. In the sock illustrated in the drawings, the top portion is preferably of two feed construction, alternate courses being knit of one thread and intervening courses being knit of one thread and intervening courses of another with an elastic thread laid in every other course.

The upper edge of the top is provided with a suitable selvage or welt W to prevent unraveling or running of the fabric. The edge may, for example, be a single thickness elastic selvage or a tubular welt preferably with elastic thread incorporated in the welt. The leg portion L and instep portion I are formed of Links-Links two-feed, double float thread fabric embodying a multi-color design produced in accordance with the present invention. The structure of this fabric is described more fully below.

The fabric of the high splice portion H*s* is similar to that of the leg except it is preferably formed wholly of outwardly facing stitches with or without the incorporation of additional splicing yarn.

The integral heel portion H and toe portion T are knit by oscillation of the needle cylinders in usual manner with appropriate narrowing and widening to provide the desired shape. The sole S is preferably formed wholly of inwardly facing stitches to provide a "reverse sole" as described and claimed in my copending application, Serial No. 726,792, Patent No. 2,512,728. Alternatively, the sole portion may be formed of outwardly facing stitches. The sole and instep together comprise a section of tubular seamless fabric produced by circular knitting. Alternate courses of the sole are knit of one thread and intervening courses of another. The toe band B is also circular knit and is preferably formed of outwardly facing stitches.

The stitch structure of the fabric forming the leg and instep portions is illustrated in Figs. 2 and 3 which show a representative portion of the fabric. For convenience of description, the unshaded blocks in Fig. 3 may be considered to represent stitches of blue thread and the shaded block stitches of red thread, it being understood, however, that any desired colors may be used. Inwardly facing stitches are indicated by an "x." Referring to Fig. 3, it is seen that an area beginning at course 1, wales 6 and 7 and extending down to course 22, wale 5, is formed of consecutive outwardly facing stitches of blue thread. A portion of this area is shown in Fig. 2 where it is seen that the stitches are of approximately twice normal length and that the red thread floats behind them. A similar area of blue stitches begins at course 7, wale 7 and extends to course 28, wales 5 and 6. These blue areas are bounded by areas formed of single length inwardly facing stitches in which courses of blue thread alternate with courses of red and are separated from one another by a single wale (wale 6) formed of inwardly facing stitches of red thread alternating with inwardly facing stitches of blue. The blue areas increase in width and again decrease, being bounded in part by diagonal lines. The term "diagonal" is used as meaning a direction other than walewise or coursewise.

As the solid blue areas are formed of outwardly facing stitches, they tend to stand out in relief from the surrounding areas formed of inwardly facing stitches. The floats of red thread behind the blue areas tend to bulge the blue stitches out and increase the embossed effect. When the fabric is stretched, the floats take the coursewise pull and prevent the fabric from flattening out even when in extended condition. The red floats do not show through the blue area in either stretched or contracted condition. A solid color effect is thus maintained at all times.

Wales 12 and 18 are formed of consecutive double length outwardly facing stitches of red thread, the blue thread being floated behind them. Wales 14 and 20 are formed of consecutive double length outwardly facing stitches of blue thread. Wale 16 is formed of regular length stitches comprising outwardly facing stitches of red thread alternating with outwardly facing stitches of blue. Intervening wales are formed of regular length stitches comprising inwardly facing stitches of red thread alternating with inwardly facing stitches of blue thread.

Areas extending from course 1, wales 27 and 28, to course 22, wale 25 and from course 8, wale 27 to course 28, wales 26 and 27 are formed of consecutive double length outwardly facing stitches of red thread and are similar to the blue areas described above. The blue thread is in like manner floated behind the red areas. Red areas and blue areas are thus arranged side by side. While they are shown as being laterally spaced, they can, if desired, be adjacent one another. The particular pattern illustrated in Figs. 2 and 3 repeats itself every 24 courses and every 40 wales.

Figure 4:
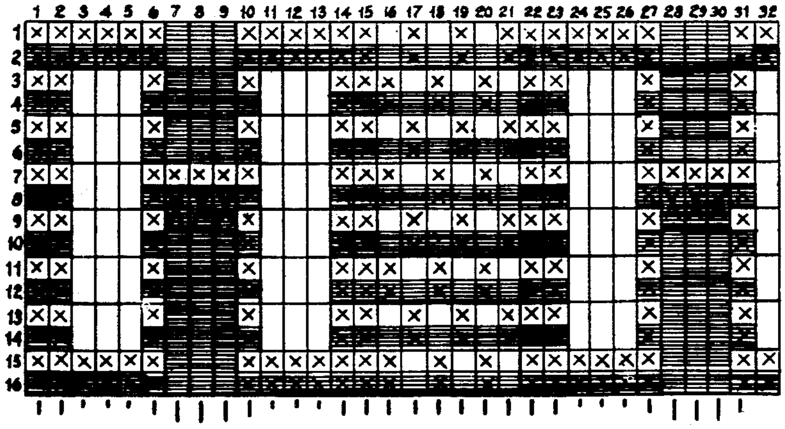

Figs. 4, 5, 6 and 7 illustrate a few of the many other patterns that can be produced in accordance with the present invention. In Fig. 4, vertically spaced blocks of one color alternate in a coursewise direction with vertically spaced blocks of another color, the blocks being separated by areas formed of inwardly facing stitches of both threads.

Figure 5:
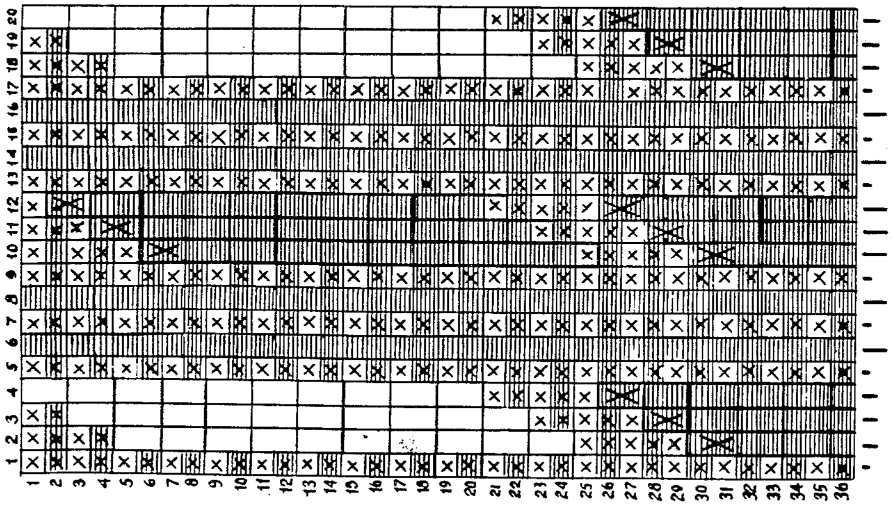

In Fig. 5, there is color over color as well as color beside color. Thus an area beginning at course 1, wale 4 and extending to course 24, wale 2, is formed of consecutively outwardly facing stitches of blue thread while a similar area beginning at course 26, wale 4 and lying in the same group of wales is formed of consecutively outwardly facing stitches of red. In wales 10 to 12, there are successive areas of red. Both red and blue areas are bounded top and bottom by diagonal lines. Solid color vertical stripes may also be provided as shown in wales 6, 8, 14 and 16.

Figure 6:
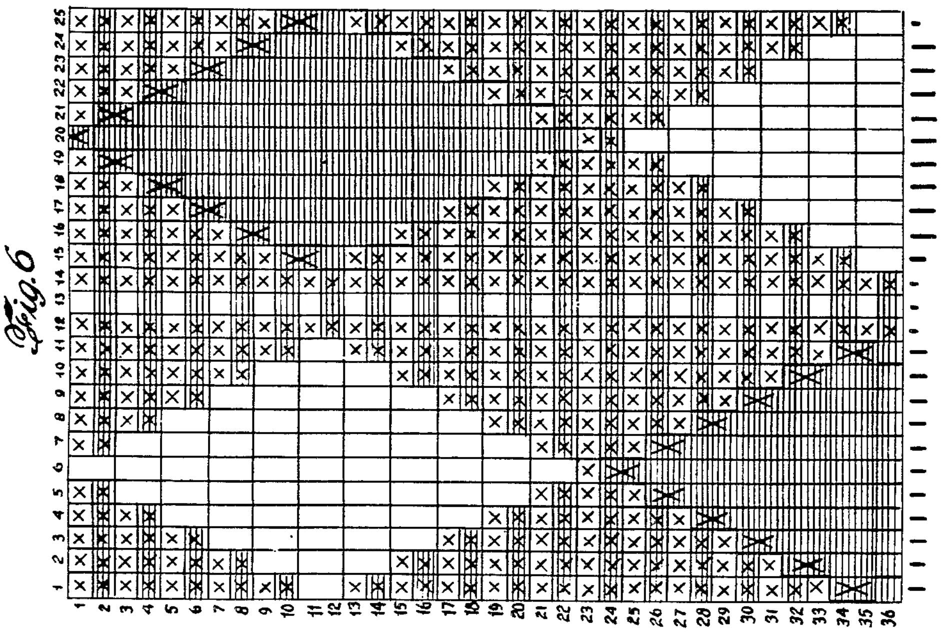
Figure 7:
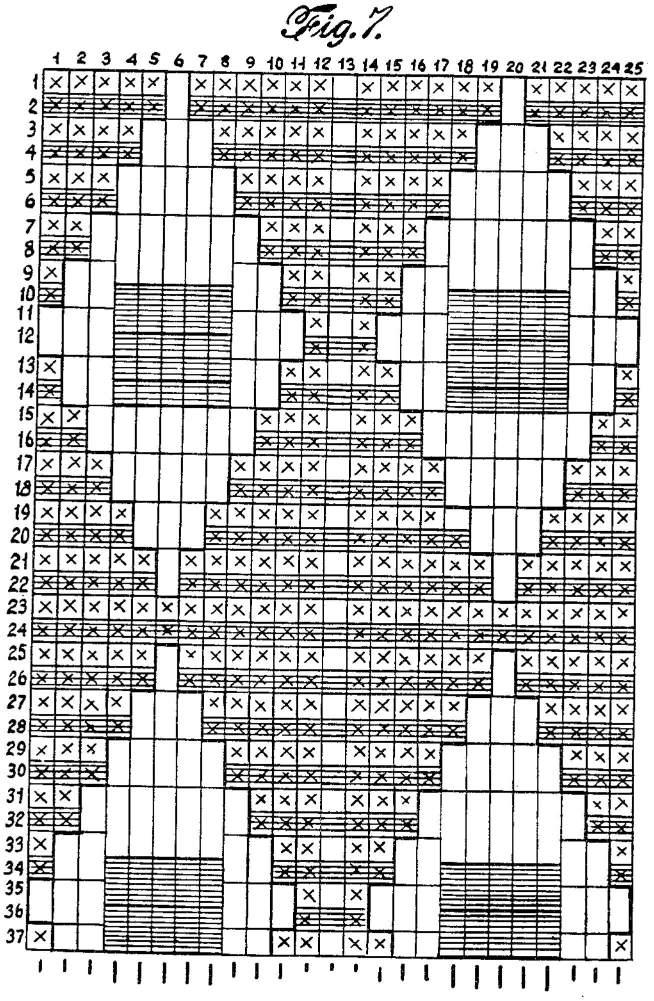

In Fig. 6, diamond-shaped blue areas alternate in both a coursewise and walewise direction with diamond-shaped red areas providing both color over color and color beside color. Fig. 7 shows a similar pattern except that an area of one color is provided inside an area of another color. It will be understood that the characteristics of the several patterns can be combined as desired and that the shape and size of the solid color areas and mixed color areas are susceptible to unlimited variations. The patterns illustrated are only a few of the many patterns made possible by the present invention.

In speaking of the thread as being of different color, the term is used broadly to include any actual or potential difference in appearance. For example, the threads may differ from one another in shade or in sheen. Likewise the threads may be of the same color when knit but of different characteristics so as to respond differently to subsequent dyeing or other treatment. One or both of the threads may be elastic. Moreover, the term "thread" is used generically to include a single strand or a plurality of strands knit together.

Apparatus for carrying out the invention is illustrated in Figs. 8 to 21.

The machine shown in the drawings is of the coaxial cylinder type having needles provided with a hook and latch at each end. The needles are transferable from one cylinder to the other and are operable in either cylinder by means of sliders having butts engageable with needle operating cams. Pattern controlled mechanism is provided for transferring the needles from one cylinder to the other in predetermined sequence during operation of the machine to produce a Links-Links pattern. For the sake of simplicity, certain parts and movements of the machine which operate in well-known manner are not specifically shown or described. The machine is provided with at least two circumferentially-spaced knitting stations at each of which cams are provided for actuating the needles to draw stitches. Thread feeding means are provided for feeding one or more threads to the needles at each station and for effecting thread changes at at least one of the stations. As the thread feeding means may be conventional, it is not shown.

Fig. 8 is a developed view of the inside of the cam boxes which surround the upper and lower cylinders and comprise cams for actuating the needles as the cylinders revolve or oscillate. Typical sliders and needles are illustrated at the right hand side of the cam boxes. Each upper slider 41 has a knitting butt 42 and a transfer butt 43. Each lower slider 44 has a knitting butt 45 and a transfer butt 46. The direction of travel of the needles relative to the cams is from right to left as indicated by the arrow A.

The upper cam block comprises a knitting cam 47 at the first knitting station, a movable clearing cam 48, fixed clearing cam 49, positioning cams 50 and 51, a knitting cam 52 at the second knitting station, movable clearing cam 53, fixed clearing cam 53*a*, and positioning cams 54 and 55 all acting on the knitting butts 42 of the upper sliders 41 to actuate the needles for receiving and knitting thread at each station. A movable transfer cam 56 and fixed transfer cam 57 act on the transfer butts 43 of the upper cylinder sliders to transfer needles from the upper to the lower cylinder.

Needles are also transferable from one cylinder to the other under control of Links-Links mechanism illustrated in Figs. 8, 10, 11, 12 and 13. The upper needle cylinder is provided with an extension carrying vertically movable selectors 58 slidable in grooves which form continuations of the grooves in the upper needle cylinder. Each of the selectors 58 has a leveling butt 59 and one or more selector butts disposed at different levels, certain selectors having butts at one or more levels and other selectors having butts at other levels. In the arrangement illustrated in Fig. 8, there are 12 selector butt levels numbered 1 to 12 respectively. It will be understood that none of the selectors will ordinarily have selector butts at all 12 levels but each selector may have one or more butts at any of the levels required to produce the desired Links-Links pattern. At each level there is provided a selector lever 60 having a cam incline adapted to engage selector butts disposed at a corresponding level to move associated selectors downwardly. A leveling cam 61, located ahead of the selector levers, engages leveling butt 59 to position all of the selectors at the proper level for engagement with the selector levers. The selector levers 60 are pivoted on a vertical shaft 62 and the rear end of each lever is bifurcated to provide a heel portion 63 and a toe portion 64. A leaf spring 65 engages the heel portion 63 and tends to move the lever into operative position to engage the butts of the selectors. Movement of the selector levers 60 to inoperative position is effected by a pattern drum 66 carrying removable projections or pins 67 adapted to engage the toe portions 64 of the selector levers to swing the cam inclines of the levers out of the path of the selector butts. The pins 67 are arranged at levels corresponding to the levels or the selector levers. The pattern drum is mounted on a shaft 68 to which step-by-step rotary movement is imparted by a pawl and ratchet mechanism 69 to move the pattern drum forward one step each revolution of the cylinder. When a selector lever engages one of the pins 67, it is held in inoperative position. Where there is no pin, the selector lever drops into operative position and engages any selector butts disposed at a corresponding level, moving the selectors downwardly to bring the transfer butts 43 of the upper sliders 42 into engagement with the upper transfer cam 56 thereby effecting the transfer of corresponding needles to the lower cylinder. By proper selection of selector butts and of pins on the pattern drum, any desired Links-Links pattern can be set up.

Separate groups or sets of selector levers are independently controlled to maintain one set inoperative while levers of another set are moved into and out of operating position to produce the desired needle transfers. In the arrangement shown in the drawings (Figs. 10 to 13), independent control is obtained by providing a bar 71 for blocking out one set of selector levers and a separate bar 72 for blocking out another set of selector levers. The upper bar 71 swings about a vertical shaft 73 and is connected by a link 74 with an arm 75 on a vertical shaft 76 provided at its lower end with an arm 77 adapted to engage a cam 78 on the end face of a drum D on the main pattern drum shaft. When the follower arm 77 rides up on cam 78, the blocking bar 71 is swung in a clockwise direction so as to press against the heel portions 63 of corresponding selector levers thereby holding the selector levers in inoperative position.

The lower blocking bar 72 is likewise swingable about the vertical shaft 73 and has a projecting arm 80 which is engaged by one end of a bellcrank lever 81 pivoted to a suitable support at 82. The other end of the bellcrank lever is connected by a lifter rod 83 (Fig. 10) with a cam follower 84 adapted to engage a cam 85 on the main pattern drum D or an extension thereof. When the cam follower rides up on cam 85 (Fig. 12), the blocking bar 72 is swung in against the heel portions 63 of certain of the selector levers to hold them in inoperative position. In the particular arrangement shown in the drawings, the upper bar 71 controls the ten upper selector levers while the bar 72 controls the two lower selector levers. However, the levers controlled by each bar can be varied as desired by varying the relative lengths and positions of the bars. If it is desired to divide the selector levers into three or more separately controlled sets, a corresponding number of blocking bars may be provided.

Suitable mechanism is provided for starting and stopping, and in some instances reversing the rotation of the Links-Links pattern drum as is understood in the art. Instead of being associated with the upper cylinder, the Links-Links mechanism may be alternatively associated with the lower cylinder cooperating with upper and lower transfer cams to transfer needles from one cylinder to the other in predetermined sequence.

When in the lower cylinder, the needles are actuated and controlled by cams of the lower cam block. At the first knitting station, there is a center cam 87 (Fig. 8) and a forward stitch cam 88 followed by a riser cam 89 and a movable clearing cam 90. At the second knitting station, there is draw down cam 91 and stitch cam 92 follower by a riser cam 93, clearing cam 94, swivel cam 95 and dividing cam 96. All of these cams are adapted to act on knitting butt 45 of the lower cylinder sliders 44 during forward rotation of the cylinder. When the cylinder is oscillated, the needles are actuated on the back swing by center cam 87, reverse stitch cam 97, riser cam 98 and clearing cam 99, cams 91 and 95 being withdrawn.

A lower transfer cam 101 acts on the transfer butts 46 of the lower cylinder sliders 44 to transfer needles from the lower to the upper cylinder. The swivel cam 95 works on the knitting butts of the sliders to raise them for engagement of the transfer butts by the lower transfer cam. The lower transfer cam 101 is slightly ahead of the upper transfer cam 56 and is movable to engage some or all of the transfer butts. When the cam 101 is all the way in, all needles in the lower cylinder are transferred to the upper cylinder whereupon selected needles are transferred down to the lower cylinder by operation of the upper transfer cam and Links-Links mechanism described above.

Actuation of the needles to produce multiple color patterns in accordance with the present invention is further controlled by movable selecting cams 102 and 103 and a swivel cam 104. Selecting cam 102 is located between the lower transfer cam 101 and the first knitting station and acts on transfer butts 46 of lower cylinder sliders 44 to raise selected sliders so high that their knitting butts pass above the center cam 87. The corresponding needles ride high, holding their previously drawn stitches, and do not knit at the first feed. The swivel cam 104 located just beyond the center cam 87 acts on the knitting butts of all of the sliders raised by the selecting cam 102, and brings the needles down sufficiently so that they do not interfere with the corresponding upper cylinder sliders when the latter are brought down by the clearing cam 49. By reason of the location and arrangement of the cams, the selection of needles at the first knitting station does not in any way interfere with transferring needles from one cylinder to the other under control of the transfer cams and Links-Links mechanism.

The selecting cam 103 is located between the first and second knitting stations and is shown as being located approximately below the movable clearing cam 90. After being drawn down by the first feed stitch cam 88, all of the needles are partially raised—but not to clearing position—by the riser cam 89. When the clearing cam 90 is withdrawn so that it does not engage the knitting butts, the selecting cam 103 engages the transfer butts of selected sliders and raises corresponding needles high enough to clear and to pass above a draw down cam 105. The knitting butts of these sliders are then engaged by the draw down cam 91 and stitch cam 92 by which the sliders are drawn down to cause corresponding needles to take and knit the thread fed at the second knitting station.

The knitting butts of sliders not raised by the selecting cam 103 ride down the face of the downwardly inclined cam 105 and pass through a raceway 106. The corresponding needles, not having been raised high enough to clear their previously drawn stitches or to take the thread fed at the second feed, by-pass the second knitting station and hold their previously drawn stitches.

The knitting butts of sliders which have been raised by the selecting cam 102 in advance of the first knitting station pass above the first feed center cam 87 and although drawn down slightly by the swivel cam 104 remain high enough that they pass over the cam 105 and are brought down by the second feed draw down cam 91 which is extended upwardly for this purpose. They continue on down the stitch cam 92 so that corresponding needles receive and knit thread fed at the second knitting station. Hence, needles which by-pass the first feed knit at the second. Selected needles which knit at the first feed by-pass the second feed. Other needles may knit at both knitting stations.

All of the needles, i. e. those which by-pass the second feed as well as those which knit, are raised by the clearing cam 94 which engages the knitting butts of the sliders. When the swivel cam 95 and the lower transfer cam 101 are in, needles raised by these cams are transferred to the upper cylinder and selected needles are immediately thereafter transferred down to the lower cylinder by the upper transfer cam and Links-Links mechanism described above. The knitting butts of the sliders then pass along the top of the reverse clearing cam 99 and the sliders continue back to the point where they again reach the selecting cam 102, thereby completing a revolution.

The operation of the machine will be understood from the following description, by way of example, of the steps in knitting the article of hosiery shown in Figs. 1 to 3. In setting up the machine for production of this article, one of the levels of the Links-Links mechanism is used to obtain the 1 x 1 needle selection for making the welt or anti-ravel edge and another for the 2 x 2 rib top. For example, the eleventh and twelfth levels may be used the Links-Links pattern of the leg and instep. The upper for this purpose. The other levels are set up to produce cylinder sliders on the sole side of the cylinder are provided with longer transfer butts than the sliders on the instep side. The lower cylinder sliders have three lengths of transfer butts arranged as illustrated at the bottom of Fig. 3 where the longest line segments indicate long butts, the shortest indicate short butts and the intermediate length indicate medium butts. While the butts are on the sliders associated with the needles rather than on the needles themselves, the various needles are for convenience hereinafter referred to as long butt needles, medium butt needles, etc., to designate needles associatd with sliders having long butts, medium butts, etc.

The articles are preferably knit by string work. After knitting a draw thread or other separation course, a selvage or welt is produced, for example by knitting a course of thread on all needles then holding alternate stitches on upper cylinder needles while knitting one or more courses on lower cylinder needles only and completing the welt by knitting a course of thread on all needles. One or more strands of elastic thread may be incorporated in the welt as it is being knit.

After completion of the welt, a 2 x 2 or other needle selection for knitting the rib knit top portion is obtained by transferring all needles to the upper cylinder by the lower transfer cam and then transferring selected needles to the lower cylinder. Both feeds are preferably employed during the knitting of the top portion. Elastic thread may be incorporated in the top portion by being laid in or knit in. By use of a single elastic thread feed finger and two fabric thread feeds, the elastic thread is incorporated in every second course.

At the beginning of the leg portion the Links-Links selector levers, which have been used in obtaining the 1 x 1 needle selection for producing the welt and 2 x 2 or other needle selection for the rib knit top portion, are blocked out of operation by the lower blocking bar 72 described above and the selector levers for making the Links-Links pattern of the leg and instep portions—which have been held out of operation by the upper blocking bar 71—are released for operation by the Links-Links pattern drum 66. The selecting cam 102 (Fig. 8) ahead of the first feed and the swivel cam 104 are put into operation. The cam 102 engages long transfer butts and raises corresponding sliders so that the knitting butts pass above the center cam 87 at the first knitting station. The lower cylinder needles actuated by these sliders are accordingly raised high so that they hold their previously drawn stitches and do not take or knit the thread fed at this feed. The swivel cam 104 brings the sliders down part way to prevent interference with needles or sliders in the upper cylinder at the clearing position. The long transfer butt sliders are brought down at the second feed by the extended cam 91 so that the needles take and knit the thread fed at the second knitting station. Sliders having medium length or short transfer butts are not engaged by the selecting cam 102 and hence lower cylinder needles actuated by these sliders receive and knit the thread fed at the first feed. In advance of the second feed, sliders having medium length transfer butts are raised by engagement with the selecting cam 103—the clearing cam 90 having been withdrawn at the beginning of the leg portion. Lower cylinder needles actuated by medium butt sliders are thereby raised to clearing position and receive and knit thread fed at the second feed. Sliders having short transfer butts are not raised by the selecting cam 103. Hence the knitting butts of these sliders ride down the downwardly inclined face of cam 105 and pas through raceway 106 so that the needles actuated by these sliders pass low at the second feed, holding their previously drawn stitches, and do not receive or knit thread fed at the feed.

Thus lower cylinder needles actuated by sliders having long transfer butts float at the first feed and knit at the second feed only, lower cylinder needles actuated by sliders having medium length transfer butts knit at both feeds, and lower cylinder needles actuated by sliders having short transfer butts knit at the first feed only and float at the second. When in the upper cylinder, all of the needles knit at both feeds. Thus certain needles knit at both feeds when in the upper cylinder and at the first feed only when in the lower cylinder, other needles at both feeds when in the upper cylinder and at the second feed only when in the lower cylinder, while still other needles knit at both feeds at all times. The size, shape and location of the solid color areas of each color are controlled by cooperation of the Links-Links mechanism and the special cams controlling the knitting or floating of the needles at each of the feeds.

Shortly before going on with the heel, the upper transfer cam 56 is put in to engage long butt sliders which are over the short knitting butt lower cylinder sliders on the sole side of the cylinder. This puts all of the needles on the sole side of the cylinder into the lower cylinder so that a section of plain knitting is produced just above the heel. The float thread pattern is continued in this portion of the fabric.

The heel is knit by oscillation of the needle cylinder while keeping needles on the instep side of the cylinder out of operation. During the knitting of the heel, the selecting cam 102 and swivel cam 104 are withdrawn to inoperative position. Draw down cam 91 and swivel cam 95 are also withdrawn while clearing cam 90 is put into operation to clear the latches after the needles have knit at the first feed.

Following the heel, continuous rotation of the needle cylinders is resumed to knit the sole and instep portions. All of the needles on the sole side of the cylinder are preferably transferred to the upper cylinder to produce a reverse sole as described and claimed in my co-pending application, Serial No. 726,792. Alternatively, they may remain in the lower cylinder to produce a plain knit sole. The selecting cam 102, swivel cam 104, draw down cam 91 and swivel cam 95 go back into operation while clearing cam 90 is withdrawn. The knitting of the Links-Links double float thread pattern is continued in the instep portion of the sock the same as in the leg portion. When the toe band portion is reached, the upper transfer cam 56 goes in all the way to bring all needles into the lower cylinder. Selecting cam 102, swivel cam 104, draw down cam 91 and swivel cam 95 are withdrawn while clearing cam 90 is put into operation, knitting at the second feed being discontinued. The toe band and toe may be knit in the usual manner. Alternatively, the lower portion of the toe band may be formed of inwardly facing stitches in accordance with my above mentioned application, Serial No. 726,792.

The embodiment of Fig. 4 is knit in the same manner except that the Links-Links mechanism is set up to produce a different pattern and the long, short and medium length transfer butts of lower cylinder sliders are arranged as indicated at the bottom of Fig. 4. An infinite number of other Links-Links double float thread patterns is possible by using different Links-Links set ups and different arrangements of lower slider transfer butts.

An alternative means of securing needle selection at the first feed is also illustrated in Fig. 8. Instead of raising selected needles by selecting cam 102, the needles which are to float at the first feed are depressed by a cam 108 which is located ahead of the lower transfer cam 101 and acts on the transfer butts of selected sliders to move the sliders downwardly. A cooperating cam 109 acts on the knitting butts of the sliders to bring the sliders down into the range of operation of the selecting cam 108. When cams 108 and 109 are in operative position, for example to engage long transfer butts, the selected sliders are brought down so that their knitting butts pass below the clearing cam 94 and through raceway 110. The corresponding needles hold their stitches and do not receive or knit the thread fed at the first knitting station. The needle selection at the second feed is the same as previously described.

The operation of the machine using selecting cam 108 for needle selection at the first knitting station is similar to the operation described above utilizing selecting cam 102. However, certain patterns that can be produced with selecting cam 102 cannot be produced with selecting cam 108 since the latter cam causes the transfer butts of selected needles to pass below the lower transfer cam 101 and hence the corresponding needles cannot be transferred to the upper cylinder during that revolution. Thus, for example, the alternative selecting cam 108 cannot be used to produce the pattern of Fig. 3 but can produce that of Fig. 4.

Another arrangement of selecting cams in the lower cylinder is illustrated in Fig. 9. This figure shows only the lower cam block, the upper cam block and Links-Links mechanism being the same as shown in Fig. 8. Cams of the lower cam block, which are the same as those in Fig. 8, are indicated by the same reference numerals. These include the usual stitch cams and transfer cam and also the selecting cam 102, which acts on the transfer butts of lower cylinder sliders in advance of the first feed to raise selected needles so that they float high at the first feed, and the swivel cam 104 for bringing selected needles down again after they have passed the stitch cams.

In the embodiment of Fig. 9, a second selecting cam 112 is provided between the selecting cam 102 and the stitch cams of the first knitting station and cooperates with the selecting cam 102 to obtain the desired needle selection. Through the cooperation of selecting cams 102 and 112, any desired needles or group of needles can be floated high at the first knitting station. If, for example, the selecting cam 102 is in far enough to engage only long transfer butts of the sliders, corresponding needles will be caused to float the first feed. By putting cam 102 in far enough to raise long and medium butt needles and cam 112 in far enough to bring the long butts back down, it is possible to float only the needles with medium length butts. In like manner, long and medium butt needles, short and medium butt needles and short butt needles only can be floated at the first feed.

Between the first and second knitting stations, there is a selecting cam 113 which is adapted to engage lower slider transfer butts and corresponds with the selecting cam 103 of Fig. 8 except that it acts downwardly instead of upwardly on selected needles. With the clearing cam 90 withdrawn, the needles after drawing stitches at the first knitting station are raised by cam 89, but are not raised far enough to clear. The selecting cam 113 engages transfer butts of selected sliders and moves the sliders down so that their knitting butts engage the downwardly inclined face of cam 115 and pass below this cam and through a raceway 116. Corresponding needles hold their previously drawn stitches and do not receive or knit the thread fed at the second feed. The knitting butts of sliders not pulled down by the selecting cam 113 engage the upwardly inclined face of cam 115 and raise corresponding needles to clear previously drawn stitches and receive the thread at the second feed. The latter needles are then brought down by draw down cam 91 and stitch cam 92 to draw new stitches of the second thread. Needles which have been floated at the first feed are too high to be affected by the selecting cam 113 and hence receive and knit the thread fed at the second feed.

The operation of the modification shown in Fig. 9 will be understood from a description of the method of knitting the fabric of Fig. 5. With the lower slider transfer butts of long, short or medium length arranged as indicated at the bottom of Fig. 5, the selecting cam 113 is put in to engage long and medium butts. The selecting cam 102 is pumped in and out by pattern mechanism described below between a position in which it engages both the long and medium butts and a position in which it engages only the long butts. When the selecting cam 102 engages only the long butts, the lower cylinder needles knitting wales 6, 8, 10 to 12, 14 and 16 will float high at the first feed and knit at the second feed while medium butt needles of wales 2 to 4 and 18 to 20 will knit at the first feed and float at the second. The cams are in this position during the knitting of courses 1 to 24. When the selecting cam 102 engages both the long and medium butts, the needles of wales 2 to 4, 6, 8, 10 to 12, 14, 16 and 18 to 20 float at the first feed and knit at the second feed. The cams are in this position during the knitting of the next 24 courses. Any short butt needles will knit at both feeds. Also all of the needles knit at both feeds when they are in the upper cylinder.

Alternatively, the selecting cam 102 can be moved in and out by pattern mechanism between a position at which it engages long transfer butts and a position at which it does not engage any. When it engages long transfer butts, corresponding needles float at the first feed and knit at the second. Needles corresponding to medium length butts knit at the first feed and float at the second feed. When cam 102 is pulled out so that it does not engage any of the butts, long and medium butt needles both knit at the first feed and both float at the second. It will be observed that no pumping of the selecting cam 113 at the second feed is required since the floating at the second feed changes automatically with changes in floating at the first feed. Any short butt needles, as well as all needles in the upper cylinder, knit at both feeds.

The fabric of Fig. 6 is also produced with the cam arrangement shown in Fig. 9. The selecting cam 113 ahead of the second feed is put in far enough to engage long and medium butts while the selecting cams 102 and 112 ahead of the first feed are pumped in and out between a position in which they cause long butt needles to float at the first feed and a position at which they cause medium butt needles to float at the first feed. With the selecting cam 102 in to engage long butts and cooperating cam 112 withdrawn, the long butt needles will float at the first feed and knit at the second while medium butt needles knit at the first feed and float at the second, as in courses 1 to 23 of Fig. 6. With the selecting cam 102 in far enough to engage long butts only, the medium butt needles will float at the first feed and knit at the second, while long butt needles will knit at the first feed and float at the second. Short butt needles knit at both feeds as in wale 13 of Fig. 6 as also do all needles when in the upper cylinder.

The fabric of Fig. 7 embodying an area of one color within an area of another color can also be produced with the cam arrangement of Fig. 9. The operation of the cams is essentially the same as described in conjunction with Fig. 5. During the knitting of courses 1 to 8 and 15 to 32, the selecting cam 102 does not engage any of the butts, while during the knitting of courses 9 to 14 and 33 to 37, selecting cam 102 engages long butts to cause corresponding needles to float at the first feed. The selecting cam 113 ahead of the second feed is in far enough to engage long and medium butts so that any long or medium butt needles which knit at the first feed are floated at the second, and conversely long or medium butt needles which float at the first feed knit at the second. Upper cylinder needles and also short butt needles in the lower cylinder knit at both feeds.

It will be understood that in knitting the fabrics of Figs. 5 to 7, the Links-Links patterning mechanism is set up and operated to produce the fabric shown by transferring needles to the upper cylinder where inwardly facing stitches are required and to the lower cylinder for outwardly facing stitches. Moreover, the sequence of operations is the same as described above in conjunction with Figs. 1 to 3, except for the differences required to produce the different Links-Links double float thread fabric of the leg and instep portions of the article of hosiery.

While operation of the machine has been described with reference to specific embodiments of fabric, it will be understood that these are solely by way of example and that the machine will produce an infinite variety of Links-Links double float thread patterns having color beside color, color over color, and color within color. Moreover, while the complete series of operations for producing an article of hosiery has not been repeated in each instance, the other forms of fabric are incorporated in socks or other articles of hosiery in the same manner as described in conjunction with Figs. 1 to 3. Various modifications can be made in the articles of hosiery and the method of producing them without departing from the invention. For example, the top portion may be formed of other kinds of fabric such, for instance, as plain fabric having elastic thread incorporated therein and the sole may be formed of plain knit fabric instead of having a reverse sole as described above.

Mechanism for operating certain of the movable cams of the cam blocks shown in Figs. 8 and 9 is illustrated in Figs. 14 to 21.

The selecting cam 102 (Fig. 8) is shown as a bolt cam controlled by a pattern cam 120 on the main pattern drum D, through mechanism illustrated in Figs. 14 and 15. A rotatably supported vertical shaft 121 carries at its lower end a cam follower arm 122 adapted to be engaged by the cam 120. A second arm 123 carried by the shaft 121 is connected by a link 124 with one end of a lever 125 pivotally supported at 126 by a fixed bracket 127. The other end of the lever 125 carries an adjustable screw 128 having at its end a button 129 adapted to engage the bolt 130 of the cam 102 to push the cam in to operative position. A spring 131 acts outwardly on the bolt to retract the cam. When the cam follower 122 rides up on pattern cam 120 the shaft is turned in a clockwise direction (Fig. 15) causing link 124 to pull on lever 125 and swing it in a clockwise direction so that the button 129 pushes in on the bolt 130 of cam 102. The extent to which the bolt cam is pushed in is regulated by the adjusting screw 128 and by the height of the pattern cam 120, which may, if desired, have two or more steps so as to push the bolt cam in farther at one time than at another.

The swivel cam 104 is actuated simultaneously with the selecting cam 102 under control of the pattern cam 120. The cam 104 is carried at the inner end of a lever 134 pivoted at 135 on a supporting portion of the cam block. The outer end of the lever 134 is connected by a link 136 with a third arm 137 on the same shaft 121 which forms part of the actuating mechanism for the selecting cam 102. When the shaft is turned clockwise by the cam follower 122 to push in on the bolt cam 102, the arm 137 pulls link 136 to swing the swivel cam lever 134 in a counterclockwise direction and thereby moves the swivel cam in to engage the knitting butts of the raised sliders.

The selecting cam 103 ahead of the second feed is shown as a bolt cam controlled by a pattern cam 140 on the main pattern drum by mechanism illustrated in Fig. 17. A cam follower 141 pivoted at 142 on a suitable support is connected by a link 143 with an arm 144 on a rotatably supported shaft 145. A second arm 146 on shaft 145 is connected by a link 147 with one arm of a bellcrank lever 148 pivotally supported at 149. The other arm of the bellcrank is adapted to engage the bolt 150 of the selecting cam 103 to press the cam in to engage the slider butts. A spring 151 tends to retract the cam. When the cam follower 141 rides up on a high portion of pattern cam 140, the bolt cam 103 is pressed in against the action of the spring 151. The bellcrank 148 may be provided with an adjusting screw to regulate the extent the cam 103 is pushed in. The pattern cam 140 is provided with two or more levels as required to give the desired cam movement.

The alternative selecting cam 108 ahead of the first feed and the cooperating cam 109 are controlled by the mechanism illustrated in Fig. 16. The cam 109 which works on the knitting butts is a bolt cam controlled by a pattern cam 154 on an extension of the main pattern drum. A cam follower 155, having a downwardly projecting cam-engaging nose 156, is pivotally supported by a shaft 157 and connected by a link 158 with one arm of a bellcrank 159 pivotally supported at 160. The other arm is connected by a twisted link 161 with an arm 162 that projects out from a sleeve 163 which is rotatably supported on a vertical axis and has a second arm 164 carrying an adjusting screw adapted to bear against the outer end of the plunger portion of the bolt cam 109. A coil spring surrounding the plunger tends to retract the cam. The pattern cam 154 has three levels. When the nose portion of the cam follower 155 rides up on a high portion of pattern cam 154, the bolt cam 109 is pressed in against the action of its spring to engage the knitting butts of all lower cylinder sliders. When the cam follower 155 is on an intermediate level of pattern cam 154, the bolt cam 109 engages long butts only.

The selecting cam 108 (Fig. 8) is a bolt cam controlled by an auxiliary cam drum 166 (Fig. 16) by which it is pumped in and out during the knitting of the leg and the instep portions of an article of hosiery. A cam follower 167 pivotally supported at 168 has a nose portion at one end adapted to be engaged by cam segments 169 of the pattern drum 166. The other end is connected by a riser 170 with one arm of a bellcrank 171 pivotally supported at 172. The other arm is connected by a link 173 with a downwardly offset arm 174 of a rotatably supported sleeve 175 having a second arm 176 carrying an adjusting screw adapted to press against the plunger portion of the bolt cam. A spiral spring surrounding the plunger tends to retract the cam. When the nose portion of the cam follower 167 rides up on a high portion of the pattern cam, the bolt cam 108 is pushed in against the action of its spring to engage the transfer butts of selected lower cylinder sliders.

The pattern drum 166 is rotated intermittently, being advanced one step each revolution of the needle cylinder. There are preferably twenty-four steps corresponding to the twenty-four steps of the Links-Links mechanism. Thus the auxiliary pattern drum is rotated one complete revolution each twenty-four revolutions of the needle cylinder. The mechanism for racking the auxiliary pattern drum 166 is illustrated in Figs. 16, 18 and 19. A cam wheel 178 on the main drive shaft 179 of the machine has a projecting cam portion 180 for engaging a roller 181 on a lever 182 which is pivoted to a suitable support at 183. A spring 184 acts on lever 182 to hold the roller in contact with the cam wheel. The lever 182 is connected by a link with a pawl carrier 186, which is freely oscillatable on the shaft of the auxiliary pattern drum 166, and carries two pawls 187 and 188 (Fig. 18) engaging a ratchet wheel 189 which is fixed on the pattern drum shaft. Each time the cam portion 180 engages the roller 181 to rock the lever 182, the pawl carrier is oscillated by the link 185 causing the pawls to advance the ratchet wheel and hence the pattern drum one step.

The racking of the auxiliary pattern drum is controlled by dual control mechanism shown in Figs. 16, 18 and 19. The first control comprises a locking lever 190 (Fig. 16) carried by a rotatably supported shaft 191 on which there is a second arm 192 having a nose portion for engaging a cam drum on the main pattern shaft. When the nose portion rides off the high portion of the cam, an adjusting screw at the end of the locking lever engages a pin 193 on the rocking lever 182 to hold the roller 181 out of engagement with the cam 180, thereby stopping oscillation of the pawl carrier 186 and the racking of the auxiliary pattern drum.

The second control of the auxiliary pattern drum comprises a bellcrank cam follower 195 swinging about an axis concentric with the shaft 157 and having one arm 196 adapted to engage a cam on the main pattern drum. The other arm is connected by a Bowden wire 198 with a bellcrank 199 pivotally supported at 200 and having a finger 201 for engagement with a pin 202 (Fig. 18) on one of the pawls 187 to hold the pawl out of engagement with the ratchet wheel 189.

The timing of these controls is such that at the beginning of the Links-Links leg portion of the sock, the rocking lever 182 is freed to start the racking of the auxiliary pattern drum. During the knitting of the heel, the rocking lever is blocked by the locking lever 190, the racking of the Links-Links pattern drum being also interrupted by its control mechanism. When the toe band is reached, the rocking lever continues to rock but the pawl 187 (Fig. 18) is held out by the finger 201. The pawl 188 continues to rack the pattern drum 166 until it reaches a position corresponding to the begininng of the pattern, at which point the auxiliary pattern drum is stopped by a blank tooth of the ratchet wheel in the path of the latter pawl. The rocking lever 182 is then blocked out until the beginning of the leg of the next sock.

The auxiliary pattern drum 166 may likewise be used to pump the selecting cam 102 and swivel cam 104 (Figs. 8 and 9) and also the selecting cam 112 (Fig. 9) in and out to produce color over color, Links-Links double float thread pattern. The mechanism may be essentially the same as described above except for such modifications as are required by the different location and nature of the cam.

A further modification for control of the selecting cams 102 and 112 is illustrated in Figs. 20 and 21. In this embodiment, the auxiliary pattern drum 166 is the same as described above and is racked in like manner except that it is provided with a plurality of adjacent cam paths. For example, there may be a path having higher cam segments, a second path having similar but lower segments, and a third cam path which is blank. A cam follower 204 is oscillatable about and also axially slidable on a post or shaft 205. The cam follower is connected by a link 206 with an arm 207 on a rotatably supported shaft 208 which carries a second arm 209 for engaging an arm 210 on the shaft 121 which as described above (compare Figs. 14 and 15) forms a part of the operating mechanism for the selecting cam 102 and swivel cam 104. These cams are hence under control of the main pattern drum as previously described and also under control of the auxiliary pattern drum 166.

The multiple paths provided on the auxiliary pattern drum 166 makes it possible by sliding the cam follower 204 from one path to another to control the timing of the cam operation and the extent to which the selecting cam is pushed in. Mechanism for shifting the cam follower 204 is shown in Figs. 20 and 21. A rock shaft 212 actuated by an arm 213 engaging cams 214 on the main pattern drum carries a forked arm 215 which engages a collar on the cam follower 204 to shift the follower axially on its pivot shaft. The cams 214 are of such length, position and height as to cause a shifting of the cam follower 204 from one path to another. By thus shifting the cam follower, great facility of control is provided.

The mechanism can, for example, be used to produce a sock having a color over color Links-Links double float thread pattern in the leg and instep portions and a plain knit sole portion. The sliders in the lower cylinder are provided with three lengths of transfer butts, the arrangement being that the portions to be floated have long transfer butts on the instep side of the cylinder. Short butts are provided for needles which are to knit at both feeds in the lower cylinder. During the knitting of the leg, the selecting cam 102 is pumped in and out between a position in which it engages long and medium butts and a position in which it does not engage any butts. When the cam 102 is in to engage the long and medium butts, the corresponding needles are floated at the first feed and are knit at the second feed. When the selecting cam 102 is out, the long and medium butt needles are knit at the first feed and floated at the second feed, the selecting cam 103 being in far enough to engage both long and medium transfer butts. During the knitting of the sole and instep portions, the selecting cam 102 is pumped in and out between a position in which it engages only the long butts and a position in which it does not engage any butts. The selecting cam 103 is likewise in far enough to engage only the long transfer butts. The floating first at one feed and then at the other is continued on the instep side of the cylinder as in the leg. However, the selecting cams do not engage the medium transfer butts and hence there is no floating on the sole side of the cylinder.

In order to move the selecting cam in farther during the knitting of the leg so as to engage both long and medium butts and a lesser distance during the knitting of the sole and instep so as to engage only the long butts, the auxiliary pattern cam is provided with one series of cams of greater lengths and a second series of similar cams of lesser length, the cam follower 204 being shifted from one cam path to the other as described above. This changeover is preferably made at the beginning of the high splice portion of a sock so that a high splice as well as the sole will be knit without floats on lower cylinder needles. The auxiliary pattern cam 166 is also provided with a blank cam path to which the cam follower is shifted when it is not desired to pump the selecting cam 102, as, for example, during the knitting of the toe band and the top. To facilitate the shifting of the auxiliary cam follower 204 from one cam path to another, the selecting cam 102 is preferably moved in momentarily by the main pattern drum acting through the mechanism described above at the beginning of the operating of the selecting cam.

Figs. 20 and 21 also illustrate by way of example, a means of operating the selecting cam 112 shown in Fig. 9. In the form of mechanism shown in the drawings, the cam 112 is a bolt cam having a spring 222 tending to move it outwardly. The cam is pushed in by an adjustable pin or button 223 carried by an extension 224 on a pivotal lever 225 which corresponds to the lever 125 of the embodiment shown in Figs. 14 and 15. Hence, cams 102 and 112 are pushed in simultaneously by pivotal movement of the lever 225 about its pivot 226. Thus, for example, when the selecting cam 102 is pushed in far enough to engage long and medium butts, cam 112 is pushed in to engage long butts. Instead of being operated jointly with cam 102, selecting cam 112 may be controlled separately, for example, from the main pattern control or an auxiliary pattern drum, chain or other control.

The auxiliary patterning mechanism illustrated in Figs. 14 to 16 and 18 to 21 may, by suitable connections, be utilized for operating other of the movable cams, as, for example, the selecting cam for floating at the second feed. Other movable cams in the upper and lower cam blocks are movable into and out of operative position or from one operative position to another by suitable pattern control mechanism, as is well understood by those familiar with knitting machines.

It will be seen from the foregoing description that the present invention makes possible the production of an infinite number of attractive multiple color patterns and accomplishes this with relatively simple mechanism which can readily be incorporated even in small diameter knitting machines, such as machines for producing hosiery without interfering with other functions of the machine. The invention thus represents an important step forward in the knitting art.

This application is a division of my prior application Serial No. 18,223, filed March 31, 1948, and now abandoned.

What I claim and desire to secure by Letters Patent is:

1. In a circular knitting machine having coaxial superposed needle cylinders operable in rotation and reciprocation with needles operable selectively in either cylinder, the combination with sliders in each cylinder to manipulate the needles, means for transferring selected needles from one cylinder to the other in predetermined sequence to produce Links-Links fabric, and at least two stations for feeding thread to the needles, of cams acting on butts provided on upper cylinder sliders to cause needles in the upper cylinder to knit thread fed at both of said stations, and cams acting selectively on butts provided on lower cylinder sliders to cause selected needles to receive and knit thread fed at each station, other selected needles to receive and knit only thread fed at one of said stations and still other selected needles to receive and knit only thread fed at the other of said stations.

2. In a circular knitting machine having coaxial superposed needle cylinders operable in rotation and reciprocation with needles operable selectively in either cylinder, the combination with sliders in each cylinder to manipulate the needles, means for transferring selected needles from one cylinder to the other in predetermined sequence to produce Links-Links fabric, and at least two stations for feeding thread to the needles, of cams acting on butts provided on upper cylinder sliders to cause needles in the upper cylinder to knit thread fed at said stations, knitting cams acting on butts on lower cylinder sliders to cause needles in the lower cylinder to knit thread fed at said stations, selecting cams acting on other butts on lower cylinder sliders to cause selected needles to by-pass the knitting cams at one station and other needles to by-pass the knitting cams at another station.

3. A knitting machine according to claim 2, in which selected lower cylinder needles receive and knit thread fed at both of said stations.

4. In a circular knitting machine having coaxial superposed needle cylinders operable in rotation and reciprocation with needles operable selectively in either cylinder, the combination with sliders in each cylinder to manipulate the needles, means acting on said sliders to transfer selected needles from one cylinder to the other in predetermined sequence to produce Links-Links fabric and at least two stations for feeding thread to the needles, of cams acting on butts provided on said sliders to cause the sliders to travel a path for actuating the corresponding needles to receive and knit thread fed at said stations, cam means disposed between the transfer means and the first of said stations to divert selected sliders from said path, cam means between said stations for restoring said diverted sliders to said path and cam means disposed between said restoring cam means and said first station for diverting other selected sliders from said path.

5. In a circular knitting machine having coaxial superposed needle cylinders operable in rotation and reciprocation with needles operable selectively in either cylinder, the combination with sliders in each cylinder to manipulate the needles, means acting on said sliders to transfer selected needles from one cylinder to the other in predetermined sequence to produce Links-Links fabric and at least two stations for feeding thread to the needles, of cams acting on butts provided on said sliders to cause the sliders to travel a path for actuating the corresponding needles to receive and knit thread fed at said stations, movable cam means disposed between the transfer means and the first of said stations to divert selected ones of a predetermined group of sliders from said path, the selection being controlled by the position of said cam means, and cam means disposed between said stations for restoring said diverted sliders to said path and for diverting from said path any sliders of said groups that were not diverted at the first station.

6. A knitting machine according to claim 5, in which said movable selecting cam means is controlled by pattern mechanism.

7. A knitting machine according to claim 5, in which said movable cam means is movable selectively to divert some, none or all of said group of sliders.

8. In a circular knitting machine having coaxial superposed needle cylinders operable in rotation and reciprocation with needles operable selectively in either cylinder, the combination with sliders in each cylinder to manipulate the needles, means for transferring selected needles from one cylinder to the other in predetermined sequence to produce Links-Links fabric, and at least two stations for feeding thread to the needles, of cams acting on butts provided on upper cylinder sliders to cause needles in the upper cylinder to knit thread fed at said stations, knitting cams acting on butts on lower cylinder sliders to cause needles in the lower cylinder to knit thread fed at said stations, selecting cams acting on other butts on lower cylinder sliders to cause selected needles to by-pass the knitting cams at one station and other needles to by-pass the knitting cams at another station, said selecting cams including cams acting on selected sliders to raise them too high to be acted on by the knitting cams at the following stations.

9. In a circular knitting machine having coaxial superposed needle cylinders operable in rotation and reciprocation with needles operable selectively in either cylinder, the combination with sliders in each cylinder to manipulate the needles, transfer cams acting on butts provided on said sliders to transfer selected needles from one cylinder to the other in predetermined sequence to produce Links-Links fabric and at least two stations for feeding thread to the needles, of cams acting on said sliders to knit thread fed at said stations, means acting on selected lower cylinder sliders at a point following said transfer cams and preceding the first of said stations to raise said sliders too high to be acted on by the knitting cams at said first station and cam means located between the first and second stations acting on the lower cylinder sliders that are by-passed high at the first station to bring said sliders into the range of action of the knitting cams at the second station.

10. In a circular knitting machine having coaxial superposed needle cylinders operable in rotation and reciprocation with needles operable selectively in either cylinder, the combination with sliders in each cylinder to manipulate the needles, transfer cams acting on butts provided on said sliders to transfer selected needles from one cylinder to the other in predetermind sequence to produce Links-Links fabric and at least two stations for feeding thread to the needles, of cams acting on said sliders to knit thread fed at said stations, means acting on selected lower cylinder sliders at a point following said transfer cams and preceding the first of said stations to raise said sliders too high to be acted on by the knitting cams at said first station and selecting means located between said first and second stations acting on selected ones of the lower cylinder sliders which are not by-passed at the first station to cause said sliders to by-pass the knitting cams at the second station.

11. In a circular knitting machine having coaxial superposed needle cylinders with needles operable selectively in either cylinder, the combination with sliders in each cylinder to manipulate the needles, means for transferring selected needles from one cylinder to the other in predetermined sequence to produce Links-Links fabric, and at least two stations for feeding thread to the needles, of cams acting on butts provided on upper cylinder sliders to cause needles in the upper cylinder to knit thread fed at both of said stations, and cams acting selectively on butts provided on lower cylinder sliders to cause selected needles to receive and knit only thread fed at one of said stations and to cause other needles to receive and knit only thread fed at the other of said stations.

References Cited in the file of this patent

UNITED STATES PATENTS

| | | |
|---|---|---|
| 2,019,396 | Deans et al. | Oct. 29, 1935 |
| 2,104,626 | Spiers et al. | Jan. 4, 1938 |
| 2,286,805 | Hurd et al. | June 16, 1942 |
| 2,316,822 | Thurston et al. | Apr. 20, 1943 |
| 2,316,823 | Thurston | Apr. 20, 1943 |
| 2,412,248 | Bristow | Dec. 10, 1946 |

FOREIGN PATENTS

| | | |
|---|---|---|
| 892,162 | France | Jan. 3, 1944 |
| 413,042 | Great Britain | July 12, 1934 |
| 426,276 | Great Britain | Apr. 1, 1935 |